United States Patent
Bainville et al.

(10) Patent No.: US 10,346,163 B2
(45) Date of Patent: Jul. 9, 2019

(54) MATRIX COMPUTATION ENGINE

(71) Applicant: Apple Inc., Cupertino, CA (US)

(72) Inventors: Eric Bainville, Sunnyvale, CA (US);
Tal Uliel, San Francisco, CA (US);
Erik Norden, San Jose, CA (US);
Jeffry E. Gonion, Campbell, CA (US);
Ali Sazegari, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 15/800,342

(22) Filed: Nov. 1, 2017

(65) Prior Publication Data
US 2019/0129719 A1    May 2, 2019

(51) Int. Cl.
*G06F 9/30* (2018.01)
*G06F 17/16* (2006.01)
*G06F 9/38* (2018.01)

(52) U.S. Cl.
CPC ...... *G06F 9/30014* (2013.01); *G06F 9/30036* (2013.01); *G06F 9/30043* (2013.01); *G06F 9/30109* (2013.01); *G06F 9/3887* (2013.01); *G06F 17/16* (2013.01)

(58) Field of Classification Search
CPC ............ G06F 9/30109; G06F 9/30036; G06F 12/0207; G06F 17/16
See application file for complete search history.

(56) References Cited

U.S. PATENT DOCUMENTS

| | | | |
|---|---|---|---|
| 4,719,588 A * | 1/1988 | Tatemichi | G06F 17/16 708/607 |
| 5,025,407 A | 6/1991 | Gulley et al. | |
| 6,901,422 B1 | 5/2005 | Sazegari | |
| 6,922,716 B2 | 7/2005 | Desai et al. | |
| 7,337,205 B2 | 2/2008 | Sazegari | |
| 7,873,812 B1 | 1/2011 | Mimar | |
| 9,235,414 B2 | 1/2016 | Gopal et al. | |
| 9,600,281 B2 | 3/2017 | Eichenberger et al. | |
| 9,658,986 B2 * | 5/2017 | Ge | G06F 17/16 |

(Continued)

FOREIGN PATENT DOCUMENTS

CN    106445471    2/2017

OTHER PUBLICATIONS

Shaoli Liu et al., "Cambricon," ACM Sigarch Computer Architecture News, ACM Special Interest Group on Computer Architecture, 2 Penn Plaza, Suite 701 New York, NY 10121-0701 USA, vol. 44, No. 3, Jun. 18, 2016 (2016-06-180, pp. 393-405, XP058300636, ISSN:0163-5964, DOI: 10:1145/3007787.3001179.

(Continued)

*Primary Examiner* — Matthew D Sandifer
(74) *Attorney, Agent, or Firm* — Meyertons, Hood, Kivlin, Kowert & Goetzel, P.C.; Lawrence J. Merkel

(57) ABSTRACT

In an embodiment, a matrix computation engine is configured to perform matrix computations (e.g. matrix multiplications). The matrix computation engine may perform numerous matrix computations in parallel, in an embodiment. More particularly, the matrix computation engine may be configured to perform numerous multiplication operations in parallel on input matrix elements, generating resulting matrix elements. In an embodiment, the matrix computation engine may be configured to accumulate results in a result memory, performing multiply-accumulate operations for each matrix element of each matrix.

20 Claims, 6 Drawing Sheets

(56) References Cited

U.S. PATENT DOCUMENTS

| | | | |
|---|---|---|---|
| 2003/0188127 A1 | 10/2003 | So | |
| 2009/0024685 A1* | 1/2009 | Salama | G06F 17/16 708/607 |
| 2010/0274990 A1 | 10/2010 | Wilder | |
| 2011/0153707 A1 | 6/2011 | Ginzburg et al. | |
| 2017/0102892 A1 | 4/2017 | Pusukuri et al. | |
| 2018/0032312 A1 | 2/2018 | Hansen et al. | |
| 2018/0074824 A1* | 3/2018 | Sazegari | G06F 9/30101 |
| 2019/0065150 A1* | 2/2019 | Heddes | G06F 7/5443 |
| 2019/0079903 A1* | 3/2019 | Dreyer | G06F 17/16 |

OTHER PUBLICATIONS

ISA, PCT/US2018/056582, Invitation to Pay Fees, dated Feb. 6, 2019, 13 pages.
ISRWO, PCT/US2018/056582, dated May 8, 2019, 20 pages.
Song Han et al: EIE: Efficient Interence Engine on Compressed Deep Neural Networks, ACM SIGARCH Computer Architecture News, ACM Special Interset Group on Computer Archtecture, 2 Penn Plaza, Suite 701 New York NY 10121-0701 USA, Stanford University, 2016, 12 pages.

* cited by examiner

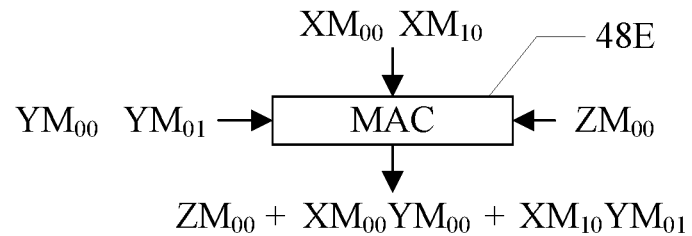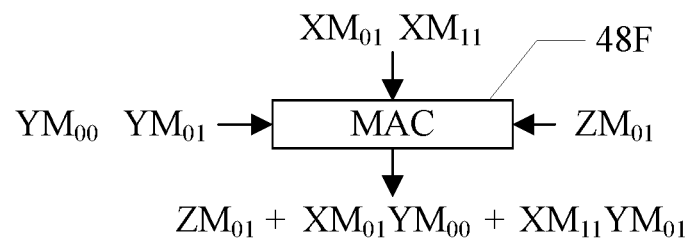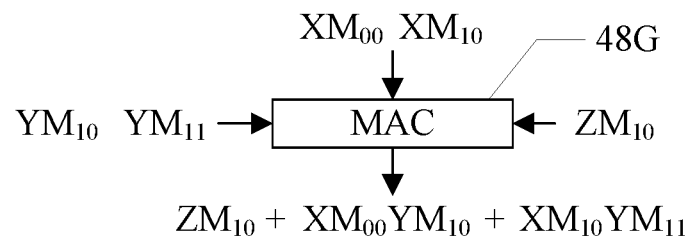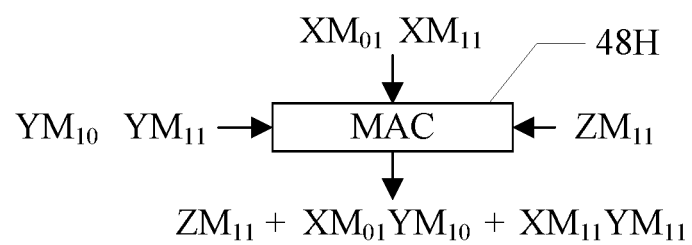
Fig. 3

| Instruction | Description |
| --- | --- |
| LoadX Xn | Load X memory from main memory at pointer Xn |
| LoadY Xn | Load Y memory from main memory at pointer Xn |
| LoadZ<sz> Xn | Load Z memory from main memory at pointer Xn. Depending on size, loads a portion or all of Z memory. |
| StoreX Xn | Store X memory to main memory at pointer Xn |
| StoreY Xn | Store Y memory to main memory at pointer Xn |
| StoreZ<sz> Xn | Store Z memory to main memory at pointer Xn. Depending on size, stores a portion or all of Z memory. |
| MAC8<size> [table] | Compute Matrix Multiplications of X and Y, Sum with Elements of Z. Size indicates output size (e.g. 16 or 32 bit) and thus portion of Z memory updated. In int2 or int4 input matrices, table specifies lookup table. |

90

Fig. 5

MATRIX COMPUTATION ENGINE

BACKGROUND

Technical Field

Embodiments described herein are related to circuitry to perform matrix operations in processor-based systems.

Description of the Related Art

A variety of workloads being performed in modern computing systems rely on massive amounts of matrix multiplications. For example, certain long short term memory (LSTM) learning algorithms are used in a variety of contexts such as language detection, card readers, natural language processing, and handwriting processing, among other things. LSTM processing includes numerous matrix multiplications. The matrix multiplications may be small integers, for example, but very large numbers of them. The performance of such operations on a general purpose central processing unit (CPU), even a CPU with vector instructions, is very low; while the power consumption is very high. Low performance, high power workloads are problematic for any computing system, but are especially problematic for battery-powered systems.

SUMMARY

In an embodiment, a matrix computation engine is configured to perform matrix computations (e.g. matrix multiplications). The matrix computation engine may perform numerous matrix computations in parallel, in an embodiment. More particularly, the matrix computation engine may be configured to perform numerous multiplication operations in parallel on input matrix elements, generating resulting matrix elements. In an embodiment, the matrix computation engine may be configured to accumulate results in a result memory, performing multiply-accumulate operations for each matrix element of each matrix. The matrix computation engine may be both high performance and power efficient, in an embodiment, as compared to a general purpose processor (even one with vector instructions), for example.

BRIEF DESCRIPTION OF THE DRAWINGS

The following detailed description makes reference to the accompanying drawings, which are now briefly described.

FIG. 3 is a block diagram illustrating one of MACs generating result matrix elements for one embodiment.

FIG. 5 is table of instructions which may be used for one embodiment of the processor and matrix computation engine.

Figure 1:
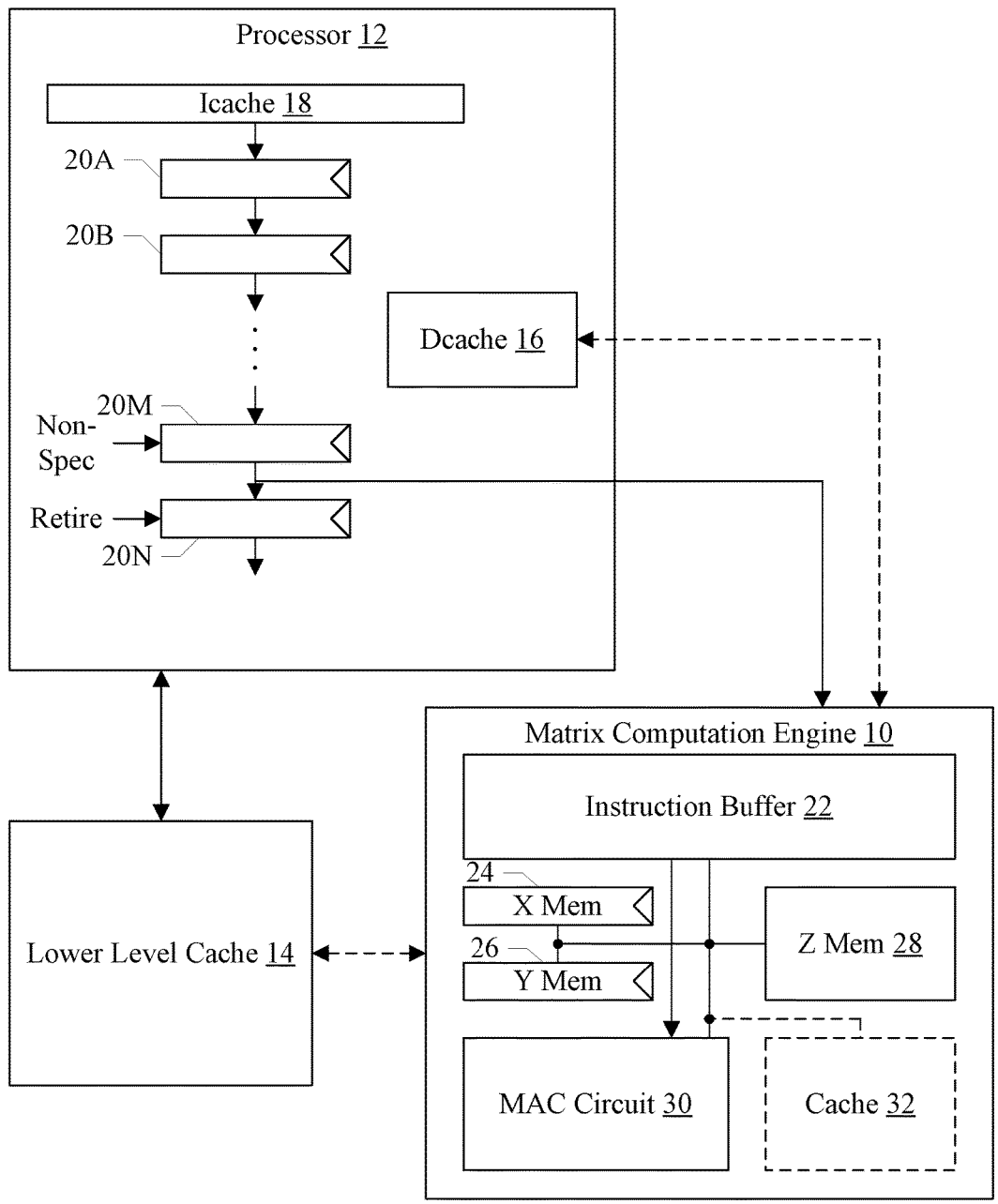
FIG. 1 is a block diagram of one embodiment of a processor, an matrix computation engine, and a lower level cache.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Turning now to FIG. 1, a block diagram of one embodiment of an apparatus including a processor 12, a matrix computation engine 10, and a lower level cache 14 is shown. In the illustrated embodiment, the processor 12 is coupled to the lower level cache 14 and the matrix computation engine 10. In some embodiments, the matrix computation engine 10 may be coupled to the lower level cache 14 as well, and/or may be coupled to a data cache (DCache) 16 in the processor 12. The processor 12 may further include an instruction cache (ICache) 18, one or more pipeline stages 20A-20N. The pipeline stages 20A-20N may be coupled in series. The matrix computation engine 10 may include an instruction buffer 22, an X memory 24, a Y memory 26, a Z memory 28, and a multiply-accumulation (MAC) circuit 30 coupled to each other. In some embodiments, the matrix computation engine 10 may include a cache 32.

The matrix computation engine 10 may be configured to perform one or more matrix computations. Specifically, in an embodiment, the matrix computation engine 10 may perform integer matrix multiplications. For example, an embodiment receives vectors of input matrices (e.g. in the X memory 24 and the Y memory 26). The MAC circuit 30 may include an array of MAC circuits. Each MAC circuit may receive selected matrix elements of matrices in the X memory 24 and the Y memory 26, and may multiply those values and add the products. Additionally, the MAC circuit 30 may receive the current value of a destination location in the Z memory 28, and may sum the current value with the multiplication result to generate the result for the Z memory 28 (thus accumulating the multiplication result with previous results).

In an embodiment, the matrix computation engine 10 may support 2×2 matrices of integers. Other embodiments may use different matrix sizes (e.g. 3×3, 4×4, etc.). As the size of the matrix increases, the number of multiplications and additions to generate one matrix element of the result increases. A balance between matrix size and the requirements of the algorithms that may make use of the matrix computation engine 10 may be determined to provide performance and economical implementation of the MAC circuit 30.

In an embodiment, the matrix elements may be 8 bit integers. Thus, a 32 bit field in the X memory 24 or the Y memory 26 may include 4 integers that are the four values of the 2×2 matrix. The matrix values may be formatted in the 32 bit quantity in row major order or column major order. Row major order may refer to a format in which the matrix elements of a given row are consecutive, or adjacent, in the value, followed by the matrix elements of the next row, etc. Column major order may refer to a format in which the matrix elements of a given column are consecutive, or adjacent, in the value, followed by the matrix elements of the next column, etc.

The matrix multiplication results may be generated and accumulated as 16 bit integers or 32 bit integers, in an embodiment. Other embodiments may employ any desired sizes (both for the input matrix elements and the accumulated elements in the result memory (Z memory 28).

In an embodiment, the matrix computation engine 10 may support smaller than 8 bit matrix elements input to the X memory 24 and the Y memory 26. For example, 4 bit integers or 2 bit integers may be used. In another embodiment, 1 bit integers may also be used. In an embodiment, a lookup table may be programmed into the matrix computation engine 10 that includes an 8 bit value for each 4 bit or 2 bit integer. The lookup table may be programmed in any desired fashion, and thus may permit coding of the values used in the manipulations. In an embodiment, the lookup table may be programmed in an entry of the X memory 24 and/or the Y memory 26. Other embodiments may supply separate storage for the lookup table. In other embodiments, any set of smaller integers than the integer size implemented by the MAC circuit 30 may be used. Similarly, in embodiments that include larger than 8 bit MAC-implemented integer sizes, any set of integer sizes smaller than the supported size may be used.

As mentioned previously, the MAC circuit 30 may be an array of MACs, not only to perform the multiplications and additions that generate the elements for one result matrix, but also to perform multiplications for multiple matrices in parallel. For example, if the X memory 24 and the Y memory 26 include 256 bit entries and 8 bit matrix elements are implemented, 8 input matrices are stored in each entry of the X memory 24 and the Y memory 26. If the memories include 512 bit entries, 16 input matrices are store in each entry. Similarly, if 1024 bit entries are supported per entry of the memory, 32 input matrices may be processed in parallel. If 128 bit entries are supported, 4 input matrices may be processed in parallel. Alternatively, the MAC circuit 30 may include a smaller number of MACs than would be used to perform all the matrix multiplications in the input operands in parallel. In such an embodiment, the matrix computation engine 10 may use multiple passes through the MAC circuit 30 for different portions of input data from the X memory 24 and the Y memory 26 to complete one array of matrix computations.

Since the Z memory accumulates matrix multiplication results, the X memory 24 and the Y memory 26 may be loaded with additional matrices to perform further matrix computations.

Using smaller integer values to represent the matrix elements may reduce the size of a given data structure on which the matrix computation engine 10 operates. The data structure may consume less memory (e.g. have a smaller "memory footprint") than a comparable data structure using larger integers or floating point values. Transferring a given number of matrices may be more efficient and may consume less power, since the power consumed in the transfer may be proportional to the amount of data moved. Additionally, the efficiency of the parallel operations may offer high performance and low power consumption per completed task than the processor 12 may natively implement. Thus, the matrix computation engine 10 may offload the computationally-intensive matrix computations from the processor 12, which may be a general purpose CPU, for example. The general purpose CPU is generally optimized for scalar integer and/or scalar floating point performance.

As mentioned above, the matrix computation engine 10 may support multiple sizes of matrix elements in the accumulated results. For example, 16 bit result matrix elements and 32 bit result matrix elements may be supported. The maximum number of result matrix elements in the Z memory 28 may be set by the size of the Z memory 28 and the size of the matrix element. Smaller sizes may consume less memory in the Z memory 28. The Z memory 28 may be arranged to write the smaller matrix elements in certain rows of the memory, leaving other rows unused. For example, if the matrix elements are ½ the size of the largest elements, every other row in the Z memory 28 may be unused. If the matrix elements are ¼ the maximum size element, every fourth row may be used, etc.

In an embodiment, the matrix computation instructions executed by the matrix computation engine 10 may also include memory instructions (e.g. load/store instructions). The load instructions may transfer vectors of matrices from a system memory (not shown) to the X memory 24 and Y Memory 26, or matrices into the Z memory 28. The store instructions may write the matrices from the Z memory 28 to the system memory. Other embodiments may also include store instructions to write matrices from the X and Y memories 24 and 26 to system memory. The system memory may be a memory accessed at a bottom of the cache hierarchy that includes the caches 14, 16, and 18. The system memory may be formed from a random access memory (RAM) such as various types of dynamic RAM (DRAM) or static RAM (SRAM). A memory controller may be included to interface to the system memory. In an embodiment, the matrix computation engine 10 may be cache coherent with the processor 12. In an embodiment, the matrix computation engine 10 may have access to the data cache 16 to read/write data. Alternatively, the matrix computation engine 10 may have access to the lower level cache 14 instead, and the lower level cache 14 may ensure cache coherency with the data cache 16. In yet another alternative, the matrix computation engine 10 may have access to the memory system, and a coherence point in the memory system may ensure the coherency of the accesses. In yet another alternative, the matrix computation engine 10 may have access to the caches 14 and 16.

In some embodiments, the matrix computation engine 10 may include a cache 32 to store data recently accessed by the matrix computation engine 10. The choice of whether or not to include cache 32 may be based on the effective latency experienced by the outer product 10 and the desired level of performance for the matrix computation engine 10. The cache 32 may have any capacity, cache line size, and configuration (e.g. set associative, direct mapped, etc.).

In the illustrated embodiment, the processor 12 is responsible for fetching the matrix computation instructions (e.g. MAC instructions, memory instructions, etc.) and transmitting the matrix computation instructions to the matrix computation engine 10 for execution. The overhead of the "front end" of the processor 12 fetching, decoding, etc. the matrix computation instructions may be amortized over the matrix computations performed by the matrix computation engine 10. In one embodiment, the processor 12 may be configured to propagate the matrix computation instruction down the pipeline (illustrated generally in FIG. 1 as stages 20A-20N) to the point at which the matrix computation instruction becomes non-speculative. In FIG. 1, the stage 20M illustrates the non-speculative stage of the pipeline. From the non-speculative stage, the instruction may be transmitted to the matrix computation engine 10. The processor 12 may then retire the instruction (stage 20N). Particularly, the processor 12 may retire the instruction prior to the matrix computation engine 10 completing the matrix computation (or even prior to starting the matrix computation, if the matrix computation instruction is queued behind other instructions in the instruction buffer 22).

Generally, an instruction may be non-speculative if it is known that the instruction is going to complete execution without exception/interrupt. Thus, an instruction may be non-speculative once prior instructions (in program order) have been processed to the point that the prior instructions are known to not cause exceptions/speculative flushes in the processor 12 and the instruction itself is also known not to cause an exception/speculative flush. Some instructions may be known not to cause exceptions based on the instruction set architecture implemented by the processor 12 and may also not cause speculative flushes. Once the other prior instructions have been determined to be exception-free and flush-free, such instructions are also exception-free and flush-free.

In the case of memory instructions that are to be transmitted to the matrix computation engine 10, the processing in the processor 12 may include translating the virtual address of the memory operation to a physical address (including performing any protection checks and ensuring that the memory instruction has a valid translation).

FIG. 1 illustrates a communication path between the processor 12 (specifically the non-speculative stage 20M) and the matrix computation engine 10. The path may be a dedicated communication path, for example if the matrix computation engine 10 is physically located near the processor 12. The communication path may be shared with other communications, for example a packet-based communication system could be used to transmit memory requests to the system memory and instructions to the matrix computation engine 10. The communication path could also be through system memory, for example the matrix computation engine may have a pointer to a memory region into which the processor 12 may write outer product instructions.

The instruction buffer 22 may be provided to allow the matrix computation engine 10 to queue instructions while other instructions are being performed. In an embodiment, the instruction buffer 22 may be a first in, first out buffer (FIFO). That is, matrix computation instructions may be processed in program order. Other embodiments may implement other types of buffers.

The X memory 24 and the Y memory 26 may each be configured to store at least one vector of matrices defined for the matrix computation instructions (e.g. 8, 16, 32, 64, etc. matrices of 8 bit matrix elements and 2×2 matrices). Similarly, the Z memory 28 may be configured to store at least one matrix computation result. The result may be an array of matrices at the result size (e.g. 16 bit matrix elements or 32 bit matrix elements). In some embodiments, the X memory 24 and the Y memory 26 may be configured to store multiple vectors of matrices and/or the Z memory 28 may be configured to store multiple result vectors of matrices. Each vector of matrices may be stored in a different bank in the memories, and operands for a given instruction may be identified by bank number.

The processor 12 fetches instructions from the instruction cache (ICache) 18 and processes the instructions through the various pipeline stages 20A-20N. The pipeline is generalized, and may include any level of complexity and performance enhancing features in various embodiments. For example, the processor 12 may be superscalar and one or more pipeline stages may be configured to process multiple instructions at once. The pipeline may vary in length for different types of instructions (e.g. ALU instructions may have schedule, execute, and writeback stages while memory instructions may have schedule, address generation, translation/cache access, data forwarding, and miss processing stages). Stages may include branch prediction, register renaming, prefetching, etc.

Generally, there may be a point in the processing of each instruction at which the instruction becomes non-speculative. The pipeline stage 20M may represent this stage for matrix computation instructions, which are transmitted from the non-speculative stage to the matrix computation engine 10. The retirement stage 20N may represent the state at which a given instructions results are committed to architectural state and can no longer by "undone" by flushing the instruction or reissuing the instruction. The instruction itself exits the processor at the retirement stage, in terms of the presently-executing instructions (e.g. the instruction may still be stored in the instruction cache). Thus, in the illustrated embodiment, retirement of outer product instructions occurs when the instruction has been successfully transmitted to the matrix computation engine 10.

The instruction cache 18 and data cache (DCache) 16 may each be a cache having any desired capacity, cache line size, and configuration. Similarly, the lower level cache 14 may be any capacity, cache line size, and configuration. The lower level cache 14 may be any level in the cache hierarchy (e.g. the last level cache (LLC) for the processor 12, or any intermediate cache level).

Figure 2:
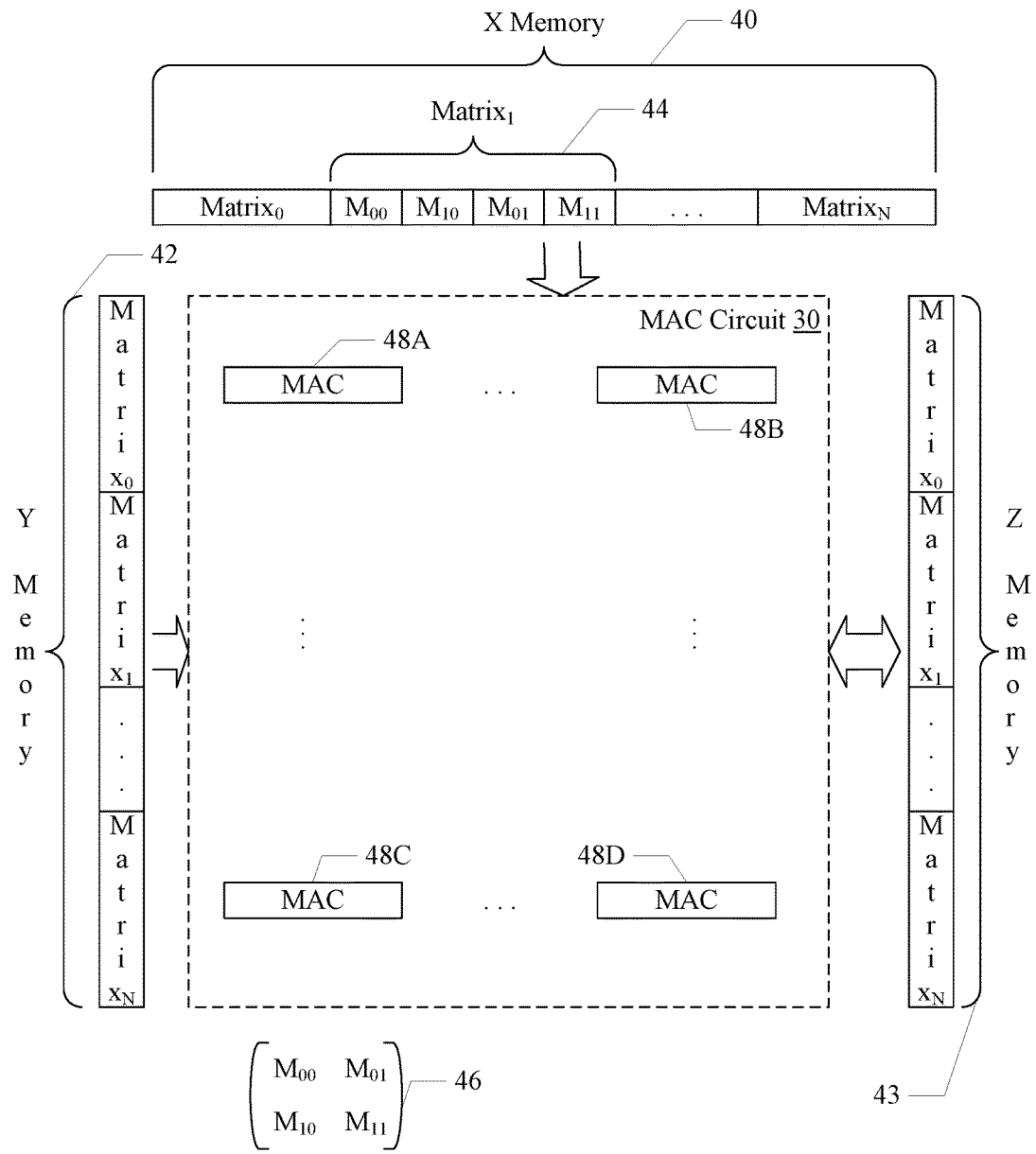
FIG. 2 is a block diagram illustrating one embodiment of X, Y, and Z memories and a multiply-accumulate (MAC) circuit for the matrix computation engine shown in FIG. 1.

Turning now to FIG. 2, a block diagram illustrating an entry of the X memory 24 (brace 40), the Y memory 26 (brace 42), the MAC circuit 30, and the Z memory 28 (brace 43) is shown. Each of the X memory entry 40 and the Y memory entry 42 may include a vector of input matrices (labeled Matrix$_0$ to Matrix$_N$ in the FIG. 2). Matrix$_1$ of the X memory entry 40 is shown in exploded view (brace 44) to include matrix elements $M_{00}$, $M_{10}$, $M_{01}$, and $M_{11}$ for a 2×2 matrix. The subscripts for the matrix elements may be the row number (0 or 1) on the left and the column number (0 or 1) on the right, as illustrated in the matrix 46 at the bottom of FIG. 2. Accordingly, as illustrated in FIG. 2, the matrices are stored in column major order. As mentioned previously, other embodiments may use row major order. It is noted that, in some embodiments, the matrix elements in the Z memory 28 may be larger than the matrix elements in the X and Y memories 24 and 26 (e.g. 16 or 32 bits, compared to 8 bits in the X memory 24 and Y memory 26).

The MAC circuit 30 includes multiple MACs, such as MACs 48A-48D shown in FIG. 2 and additional MACs as illustrated by the ellipses in FIG. 2. Each of the MACs 48A-48D may receive one or more matrix elements from the X memory entry 40 and one or more matrix elements from the Y memory entry 42 to generate a matrix element output for the Z memory 28. The MACs may also receive the current values of the corresponding matrix elements from the Z memory 28 to perform the accumulation operation. There may be one MAC per matrix element in the Z memory 28. The MAC may perform the multiplication and addition that generates the resulting matrix element for the matrix multiplication Z=Y×X. That is, for element $M_{ab}$ of one of the matrices in Z, the MAC may multiply the matrix elements of row a of Y with the matrix elements of column b of X, and add the results along with the current value of $M_{ab}$ in the matrix of Z. Other embodiments may implement the matrix multiplication Z=X×Y. In such an embodiment, for element $M_{ab}$ of one of the matrices in Z, the MAC may multiply the matrix elements of row a of X with the matrix elements of column b of Y, and add the results along with the current value of $M_{ab}$ in the matrix of Z.

FIG. 3 is a block diagram illustrating the 4 MACs 48E-48H that generate results for the matrix multiplication for 2×2 matrices for one of the matrices in the vectors X and Y, generate a result matrix for Z. Each MAC 48E-48H receives a row of the Y matrix (elements YM in FIG. 3) and a column of the X matrix (elements XM in FIG. 3). Corresponding elements are multiplied (e.g. the first element in the row with the first element in the column, the second element in the row with the second element in the column, etc.). The results are added, and the current value is included in the addition, to generate the output.

For example, the MAC 48E receives row zero of a Y matrix ($YM_{00}$ and $YM_{01}$) and column zero of an X matrix ($XM_{00}$ and $XM_{10}$) as well as the current value from the matrix element at row 0, column 0 of the corresponding Z matrix ($ZM_{00}$). The result of the MAC ($ZM_{00}+XM_{00}YM_{00}+XM_{10}YM_{01}$) is output as the new value for $ZM_{00}$. Similarly, the MACs 48F, 48G, and 48H receive rows of the Y matrix, columns of the X matrix, and current values of Z matrix elements and generate $ZM_{01}$, $ZM_{10}$, and $ZM_{11}$, respectively. A similar set of MACs may be provided for each other matrix in the vectors.

In an embodiment, the Z matrix may accumulate larger integer matrix elements than the input integer matrix elements. For example, in an embodiment, the input matrix elements may be 8 bits and the Z matrix may have 16 bit or 32 bit elements. Thus, the MACs 48 may receive 8 bit inputs and produce 16 bit or 32 bit outputs. Other embodiments may have different sizes for either matrix elements.

Figure 4:
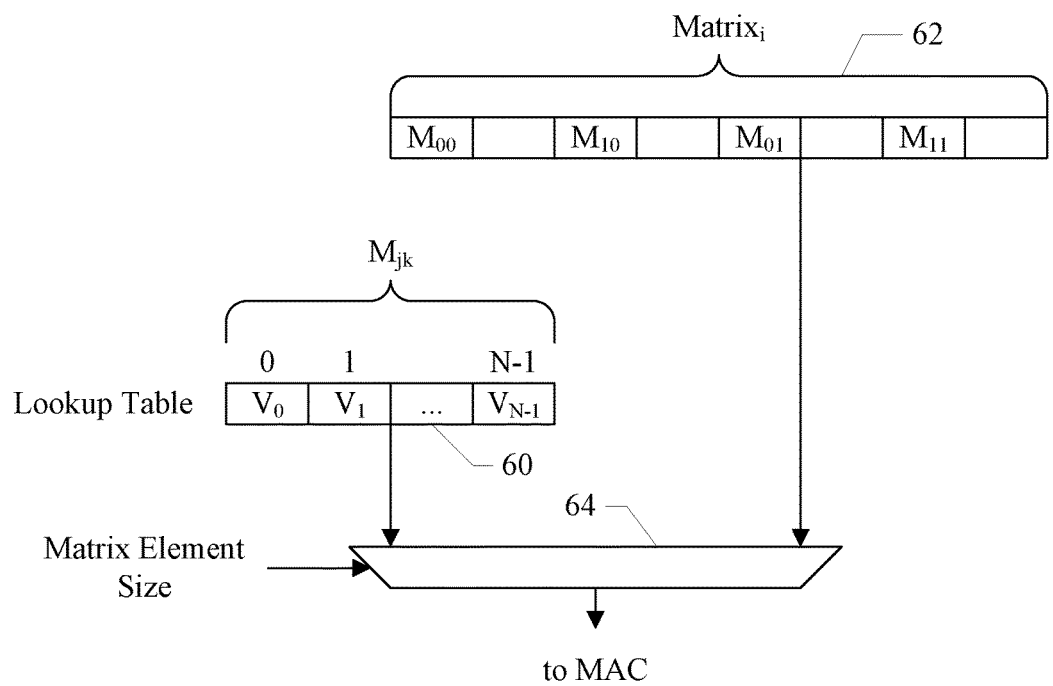
FIG. 4 is a block diagram illustrating matrix element value remapping for one embodiment.

FIG. 4 is a block diagram illustrating an embodiment that accepts matrices having elements smaller than the implemented matrix element size (e.g. 4 bit or 2 bit elements, with an 8 bit implemented element size). For example, in some LSTM networks, the weights that are applied to input data to the model (learned in previous operation) may be 4 bit or 2 bit integers. The input data to the model may be, e.g., the implemented size (e.g. 8 bit). In the embodiment of FIG. 4, a lookup table 60 is provided which may be programmable with values (e.g. values $V_0$ to $V_{N-1}$ in FIG. 4) to which input matrix elements may be mapped. The matrix element value may be an index into the lookup table 60, and the corresponding value may be read from lookup table 60 and substituted for the matrix element value from the X memory 24 or the Y memory 26 through the mux 62. The matrix$_i$ 62 is shown in FIG. 4 as an example matrix from the X memory or Y memory, with matrix elements M$_{00}$, M$_{01}$, M$_{10}$, and M$_{11}$ that are smaller than the element size and thus there is space in the matrix$_i$ 62 between the elements. That is, the matrix$_i$ storage area may include storage sufficient for the implemented element size, and the element size of the smaller elements does not fill the storage.

Each element is used as an index into the table 60 (e.g. M$_{jk}$ in FIG. 4), so the number of values N in the table may be $2^{number\_of\_bits\_in\_matrix\_element}$ (e.g. 16 for 4 bits, or 4 for 2 bits). In an embodiment, the table 60 may be stored in an X memory entry or Y memory entry, and may be loaded from memory in a fashion similar to the loading of vectors of matrices into the X memory 24 and Y memory 26. Accordingly, the mapping of smaller values to larger values may be under the control of software, which may use the mapping to implement a coding/decoding scheme, to numerically convert the smaller values to larger values, or any other purpose.

The selection control on the mux 64 may be the matrix element size. If the element size is the implemented element size (e.g. 8 bits), the mux 64 may select the output of the matrix storage location (e.g. reference numeral 62). Otherwise, the output of the lookup table may be selected.

It is noted that different implementations of reading matrix elements from the X memory 24 or Y memory 26 and selectively replacing the matrix elements with lookup table output values may be used. FIG. 4 illustrates the logical construction of the lookup table, but is not necessarily physically how it is implemented.

FIG. 5 is a table 90 illustrating an exemplary instruction set for one embodiment of the matrix computation engine 10. Other embodiments may implement any set of instructions, including subsets of the illustrated set, other instructions, a combination of subsets and other instructions, etc.

The memory operations may include load and store instructions. Specifically, in the illustrated embodiment, there are load and store instructions for the X, Y, and Z memories, respectively. In the case of the Z memory 28, a size parameter may indicate which matrix element size is being used and thus which rows of the Z memory are written to memory or read from memory (e.g. all rows, every other row, ever fourth row, etc.). In an embodiment, the X and Y memories may have multiple banks for storing different vectors of matrices. In such an embodiment, there may be multiple instructions to read/write the different banks or there may be an operand specifying the bank affected by the load/store X/Y instructions. In each case, an X memory bank may store a pointer to memory from/to which the load/store is performed. The pointer may be virtual, and may be translated by the processor 12 as discussed above. Alternatively, the pointer may be physical and may be provided by the processor 12 post-translation.

The MAC instruction may perform a matrix multiplication on the matrices in the X and Y vectors and may sum the resulting matrix elements with the corresponding elements of the Z memory 28. Particularly, the MAC instruction performs the multiplication of matrices in Y by the corresponding matrices in X, in an embodiment. Other embodiments may multiply the matrices in X by the corresponding matrices in Y, or two forms of the instruction may be supported to select which multiplication is desired. The optional table operand may specify the lookup table if the input matrices use matrix elements that are smaller than the implemented size.

Figure 6:
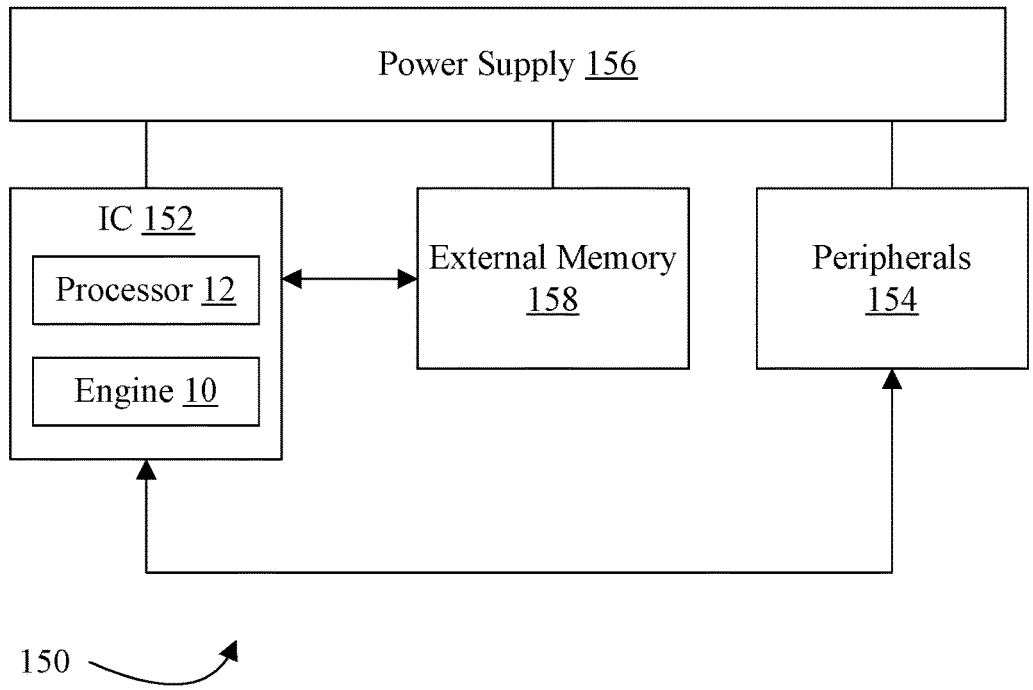
FIG. 6 is a block diagram of one embodiment of a system.

FIG. 6 is a block diagram of one embodiment of a system 150. In the illustrated embodiment, the system 150 includes at least one instance of an integrated circuit (IC) 152 coupled to one or more peripherals 154 and an external memory 158. A power supply 156 is provided which supplies the supply voltages to the IC 152 as well as one or more supply voltages to the memory 158 and/or the peripherals 154. The IC 152 may include one or more instances of the processor 12 and one or more instances of the matrix computation engine 10. In other embodiments, multiple ICs may be provided with instances of the processor 12 and/or the matrix computation engine 10 on them.

The peripherals 154 may include any desired circuitry, depending on the type of system 150. For example, in one embodiment, the system 150 may be a computing device (e.g., personal computer, laptop computer, etc.), a mobile device (e.g., personal digital assistant (PDA), smart phone, tablet, etc.), or an application specific computing device capable of benefiting from the matrix computation engine 10 (e.g., neural networks, LSTM networks, other machine learning engines including devices that implement machine learning, etc.), In various embodiments of the system 150, the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAIVIBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the IC 152 in a chip-on-chip or package-on-package implementation.

Figure 7:
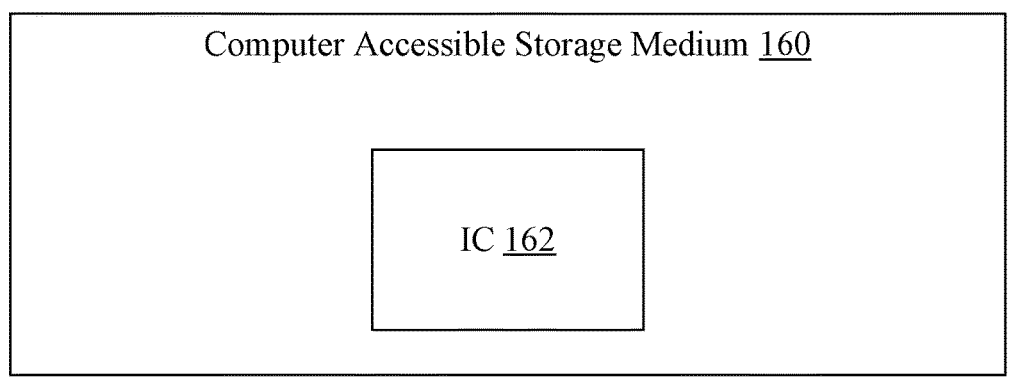
FIG. 7 is a block diagram of one embodiment of a computer accessible storage medium.

FIG. 7 is a block diagram of one embodiment of a computer accessible storage medium 160 storing an electronic description of the IC 152 (reference numeral 162) is shown. More particularly, the description may include at least the matrix computation engine 10 and/or the processor 12. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data.

Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 160 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 162 of the IC 152 stored on the computer accessible storage medium 160 may be a database which can be read by a program and used, directly or indirectly, to fabricate the hardware comprising the IC 152. For example, the description may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the IC 152. The netlist may then be placed and routed to produce a data set describing geometric shapes to be applied to masks. The masks may then be used in various semiconductor fabrication steps to produce a semiconductor circuit or circuits corresponding to the IC 152. Alternatively, the description 162 on the computer accessible storage medium 300 may be the netlist (with or without the synthesis library) or the data set, as desired.

While the computer accessible storage medium 160 stores a description 162 of the IC 152, other embodiments may store a description 162 of any portion of the IC 152, as desired (e.g. the matrix computation engine 10 and/or the processor 12, as mentioned above).

Numerous variations and modifications will become apparent to those skilled in the art once the above disclosure is fully appreciated. It is intended that the following claims be interpreted to embrace all such variations and modifications.

What is claimed is:

1. An apparatus comprising:
   a processor configured to fetch a matrix computation instruction; and
   a matrix computation engine coupled to the processor, wherein:
   the matrix computation engine is configured to perform a matrix multiplication operation in response to the matrix computation instruction;
   the matrix computation engine comprises at least two input memories configured to store input vectors of matrices for the matrix multiplication operation and an output memory configured to accumulate an output vector of matrices; and
   the matrix computation engine comprises a multiply accumulation (MAC) circuit configured to perform the matrix multiplication operation on the input vectors of matrices, generating the output vector of matrices for the output memory.

2. The apparatus as recited in claim 1 wherein the MAC circuit comprises a plurality of MACs, each MAC configured to generate one matrix element of one matrix in the output vector.

3. The apparatus as recited in claim 2 wherein a number of the plurality of MACs is equal to a number of matrix elements in the output vector.

4. The apparatus as recited in claim 2 wherein a number of the plurality of MACs is less than a number of matrix elements in the output vector, and wherein the matrix computation instruction is completed by iterating the plurality of MACs with different portions of the input vectors and the output vector.

5. The apparatus as recited in claim 1 wherein the MAC circuit is configured to perform matrix multiplications on matrix elements having a first size, and wherein a first input vector stored in one of the at least two vector memories includes matrix elements having a second size less than a first size, wherein the matrix computation engine is configured to map matrix elements from the first input vector to second matrix elements having the first size using a lookup table, wherein the second matrix elements are provided to the MAC circuit for the matrix multiplication operations.

6. The apparatus as recited in claim 5 wherein the lookup table is programmable from the processor.

7. The apparatus as recited in claim 6 the lookup table is stored in one of the at least two input memories.

8. A matrix computation engine comprising:
   a circuit configured to perform a matrix multiplication operation on a first vector operand and a second vector operand, producing a resulting output vector;
   a first operand memory coupled to the circuit, wherein the first operand memory is configured to store the first vector operand, wherein the first vector operand includes a first plurality of matrices having matrix elements of a first size;
   a second operand memory coupled to the circuit, wherein the second operand memory is configured to store a second vector operand, wherein the second vector operand includes a second plurality of matrices;
   wherein the circuit is configured to perform matrix multiplication operations on matrix elements having a second size greater than the first size; and
   the matrix computation engine includes a lookup table to map the matrix elements of the first plurality of matrices to the second size.

9. The matrix computation engine as recited in claim 8 wherein the second plurality of matrix elements has matrix elements of the first size, and wherein the lookup table maps the matrix elements of the second plurality of matrices to the second size.

10. The matrix computation engine as recited in claim 8 wherein the circuit comprises a plurality of multiply-accumulate circuits, wherein the plurality of multiply-accumulate circuits are couple to receive input matrix elements of the second size corresponding to matrix elements from the first operand memory and the second operand memory and configured to generate result matrix elements of a third size greater than the second size.

11. The matrix computation engine as recited in claim 10 further comprising an output memory configured to store matrix multiplication results, wherein the plurality of multiply-accumulate circuits are coupled to receive matrix elements from the output memory to accumulate with a multiplication result of the input matrix elements, wherein the matrix elements from the output memory are of the third size.

12. The matrix computation engine as recited in claim 10 where a number of the plurality of multiply-accumulate circuits is equal to a number of matrix elements in the output memory.

13. The matrix computation engine as recited in claim 10, a number of the plurality of multiply-accumulate circuits is less than a number of matrix elements in the output vector, and wherein the matrix computation instruction is completed by iterating the plurality of multiply-accumulate circuits with different portions of the input vectors and the output memory.

14. The matrix computation engine as recited in claim 8 wherein the first plurality of matrices are stored in column major order.

15. The matrix computation engine as recited in claim 8 wherein the first plurality of matrices are stored in row major order.

16. The matrix computation engine as recited in claim 8 wherein the lookup table is programmable.

17. The matrix computation engine as recited in claim 16 wherein the lookup table is stored in one of the first operand memory and the second operand memory.

18. A matrix computation engine comprising:
a first operand memory configured to store a first plurality of matrices;
a second operand memory configured to store a second plurality of matrices; and
a plurality of multiply-accumulate circuits coupled to the first operand memory and the second operand memory, wherein each multiply-accumulate circuit of the plurality of multiply accumulate circuits is configured to multiply a respective matrix element of the first plurality of matrices and a corresponding matrix element of the second plurality of matrices.

19. The matrix computation engine as recited in claim 18 further comprising an output memory configured to store a third plurality of matrices, wherein each multiply-accumulate circuit of the plurality of multiply-accumulate circuits is configured to add a corresponding matrix element in the third plurality of matrices to a result of the multiplication and write a second result of the addition to the output memory.

20. The matrix computation engine as recited in claim 18 wherein the plurality of multiply-accumulate circuits are configured to multiple matrix elements of a first size, and wherein at least the first plurality of matrices have matrix elements of a second size that is smaller than the first size, and wherein the matrix computation engine comprises a lookup table mapping matrix elements of the second size to matrix elements of the first size.

* * * * *

UNITED STATES PATENT AND TRADEMARK OFFICE
CERTIFICATE OF CORRECTION

PATENT NO. : 10,346,163 B2
APPLICATION NO. : 15/800342
DATED : July 9, 2019
INVENTOR(S) : Eric Bainville et al.

Page 1 of 1

It is certified that error appears in the above-identified patent and that said Letters Patent is hereby corrected as shown below:

In the Claims

Claim 8, Column 12, Line 34-35, please delete "a second vector operand" and insert --the second vector operand--

Claim 12, Column 12, Line 64, please delete "The matrix engine as recited in claim 10" and insert --The matrix computation engine as recited in claim 11--

Claim 13, Column 13, Line 1, please delete "The matrix computation engine as recited in claim 10" and insert --The matrix computation engine as recited in claim 11--

Claim 13, Column 13, Line 6, please delete "input vectors and the output" and insert --first vector operand and second vector operand--

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*